(12) United States Patent
Fuge et al.

(10) Patent No.: US 6,472,981 B2
(45) Date of Patent: Oct. 29, 2002

(54) MACHINE TOOL PROBE WITH WIRELESS SIGNAL TRANSMISSION

(75) Inventors: Jonathan P Fuge, Stonehouse (GB); David Collingwood, Stroud (GB)

(73) Assignee: Reinshaw PLC, Gloucestershire (GB)

( * ) Notice: Subject to any disclaimer, the term of this patent is extended or adjusted under 35 U.S.C. 154(b) by 65 days.

(21) Appl. No.: 09/793,148

(22) Filed: Feb. 27, 2001

(65) Prior Publication Data

US 2001/0017590 A1 Aug. 30, 2001

(30) Foreign Application Priority Data

Feb. 29, 2000 (GB) .............................. 0004727

(51) Int. Cl.[7] .................................. G08B 1/08
(52) U.S. Cl. ................. 340/539; 356/477; 356/486; 356/489; 356/498; 324/96
(58) Field of Search ................. 340/539, 679, 340/680; 356/486, 489, 498, 477; 324/96

(56) References Cited

U.S. PATENT DOCUMENTS

| 4,577,967 | A | * | 3/1986 | Fujita ........................ 356/489 |
| 4,999,570 | A | * | 3/1991 | Ehrler ........................ 324/96 |
| 5,377,006 | A | * | 12/1994 | Nakata ........................ 356/486 |
| 6,128,083 | A | * | 10/2000 | Nogami ........................ 356/498 |
| 6,181,429 | B1 | * | 1/2001 | Barberis et al. ............ 356/477 |

FOREIGN PATENT DOCUMENTS

EP 0 337 669 B1 10/1989

* cited by examiner

*Primary Examiner*—Daryl Pope
(74) *Attorney, Agent, or Firm*—Oliff & Berridge, PLC

(57) ABSTRACT

An optical signal transmission circuit for a probe is switched on by an optical switch-on signal comprising a burst 42 of pulses having a predetermined length. This is detected by a circuit which discriminates whether an input signal is a genuine switch-on signal or an interference burst 44, on the basis of the duration of the switch-on signal.

8 Claims, 3 Drawing Sheets

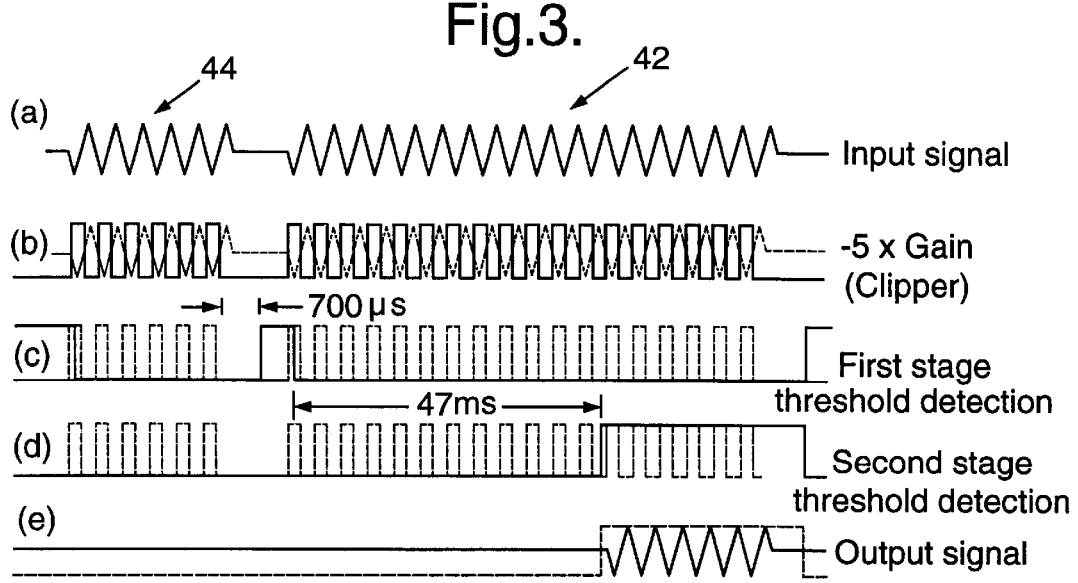
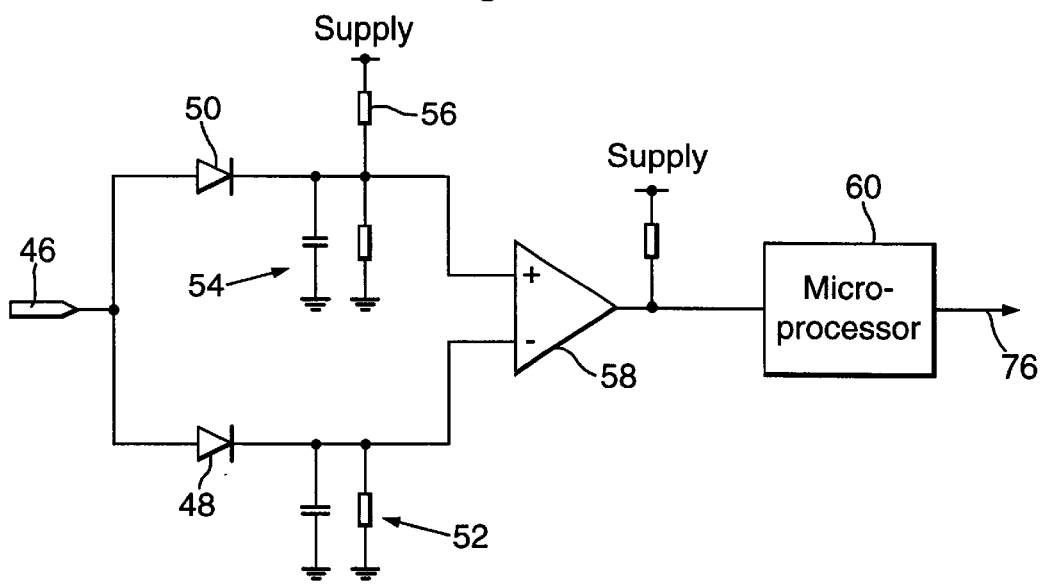

MACHINE TOOL PROBE WITH WIRELESS SIGNAL TRANSMISSION

FIELD OF THE INVENTION

This invention relates to probes for use in measurement on positioning machines, such as machine tools.

DESCRIPTION OF PRIOR ART

It is known to provide a probe on a machine tool. The probe may for example be mounted in the tool-holding spindle of the machine tool, in order to measure a workpiece placed on the bed or table of the machine tool. Because such a probe is interchangeable with cutting tools, it is not possible to provide permanent wiring to transmit its signal back to the machine's controller. Consequently, it is common to provide a wireless signal transmission system, particularly an optical (e.g. infrared) transmission system. An optical transmitter such as one or more light emitting diodes is provided on the probe housing, and sends signals to an optical receiver positioned at a convenient place on the fixed structure of the machine.

Such probes need to be battery powered. To conserve battery life, it is desirable that they should only be switched on when required for use. It is known, e.g. from European Patent No. 337669 to provide an optical switch-on or start signal. In a product commercially available from Renishaw plc, an optical transmitter is provided in the same module as the optical receiver mounted on the fixed structure of the machine. When the probe is to be switched on, this transmits a burst of optical pulses to an optical receiver mounted on the housing of the probe. The probe includes a detector circuit, drawing very low quiescent current, which detects the burst of pulses and switches on the rest of the probe circuitry.

Such a switch-on or start signal system can operate incorrectly, as a result of optical interference. Such interference can be generated for example, by xenon beacons on adjacent machine tools, and by fluorescent lighting systems using a switched mode power factor correcting ballast. In recent years, these have been used increasingly, and so the problem of interference is becoming more significant. When a probe is switched on incorrectly, its battery life is reduced. In addition, in a few cases more extreme problems have been noted, where the signal from an incorrectly switched on probe has been received by the machine's controller, causing it to take unwanted action.

The commercially available probes mentioned above include a band pass filter tuned to the same frequency as the pulses of the switch-on signal, in order to exclude interference. However, it has been found that some interference problems still remain.

SUMMARY OF THE INVENTION

The present invention results from research carried out by the inventors to analyse the nature of the interference. They have found that interference sources such as xenon beacons and power corrected fluorescent lighting can produce wide band interference, which is not completely removed by the band pass filter.

The inventors also discovered that the interference has characteristics different from the burst of pulses used as a start signal, and the present invention uses some of those differences to differentiate between interference and a genuine start signal.

Accordingly, the present invention provides a probe having a wireless signal transmission circuit, a detecting circuit for detecting an optical switch-on signal and switching on the signal transmission circuit when the switch-on signal is received, the detecting circuit including a time discriminating circuit which discriminates whether an input signal is a switch-on signal or interference on the basis of the duration of the switch-on signal.

BRIEF DESCRIPTION OF THE DRAWINGS

Preferred embodiments of the invention will now be described by way of example, with reference to the accompanying drawings, wherein:

FIG. 3 shows signal waveforms at various parts of the circuit of FIG. 2, FIG. 4 is a schematic circuit diagram of a second embodiment.

DESCRIPTION OF PREFERRED EMBODIMENTS

Figure 1:
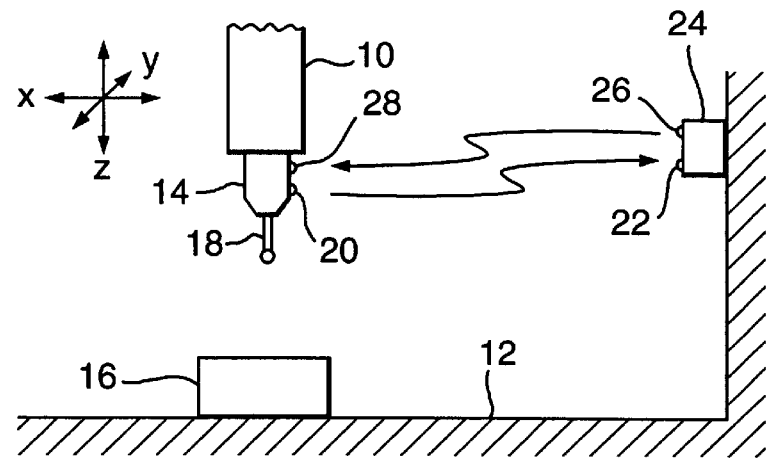
FIG. 1 is a schematic diagram of a probe on a machine tool, with an optical signal transmission system.

FIG. 1 shows diagrammatically a machine tool, comprising a spindle 10 which is movable in three dimensions X,Y,Z relative to a table 12. The spindle 10 normally holds a cutting tool, but this can be exchanged for a probe 14 such as sold by Renishaw plc. The table 12 holds a workpiece 16, and the probe 14 has a stylus 18 which is brought into contact with the workpiece 16 in order to make measurements.

The probe 14 is battery powered, and has an optical (e.g. infrared) transmitter 20 which sends measurement signals from the probe to an optical receiver 22 in a module 24 mounted on the fixed structure of the machine tool. This then sends the signals on to a computer numerical controller of the machine tool.

The module 24 also includes an optical (e.g. infrared) transmitter 26. When commanded by the machine tool's controller, this transmits a burst of optical pulses to a receiver 28 on the probe 14. This constitutes a switch-on signal or start signal for the probe 14.

The optical start signal may comprise a 250 ms burst of pulses at 7.8 kHz.

Figure 2:
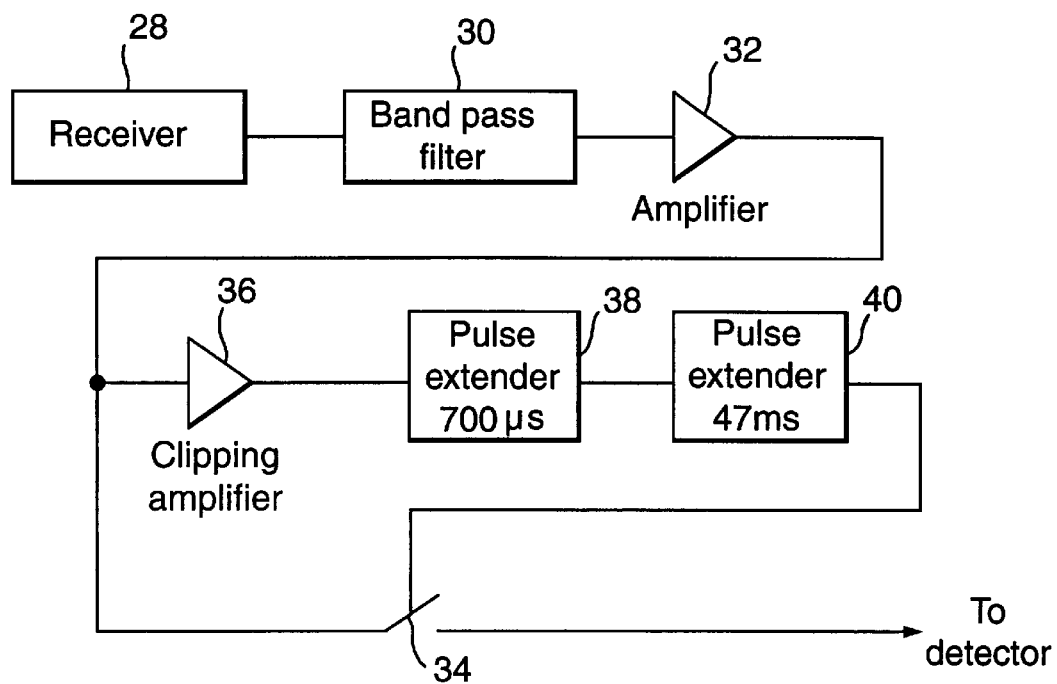
FIG. 2 is a schematic circuit diagram of a first embodiment.

FIG. 2 shows circuitry in the probe 14, in the first embodiment of the invention. The start signal received by the receiver 28 is first filtered by a 7.8 kHz band pass filter 30, and then amplified in an amplifier 32. Conventionally, the resulting signal would then be taken straight to a detector for detecting the 7.8 kHz signal, and switching on the remaining circuitry of the probe when detected.

However, in the present embodiment the signal is taken from the amplifier 32 to this detector via an analogue electronic switch 34. The switch 34 is chosen, like the rest of the circuit of FIG. 2, for its low power consumption when the probe is in the "off" state and just waiting for a start signal. This is important, in order to conserve battery life.

In the embodiment of FIG. 2, the switch 34 is controlled by means of a clipping amplifier 36 and two pulse extenders 38, 40. The operation of the circuit elements 36, 38, 40 will now be described with reference to the signal timing diagrams in FIG. 3.

FIG. 3(a) represents the input signal received by the probe receiver 28, after passing through the 7.8 kHz band pass filter 38 and the amplifier 32. A burst of pulses resulting from a normal start signal is shown at 42, while a shorter burst of pulses caused by interference is shown at 44.

The clipping amplifier 36 provides a small signal gain of −5, causing the signal to swing to both power supply rails, squaring the signal. The result is shown in FIG. 3(b).

The pulse extender 38 is a simple FET switch used as a threshold detector, combined with a resistor and capacitor to provide a 700 μs time constant. It operates as follows. When the input is above the threshold, the output is low. When the input falls below the threshold (i.e. a trailing edge) the output stays low for the duration of the time constant, then goes high. At other times, when the input is below the threshold, the output is normally high. Each succeeding trailing edge in the input waveform re-triggers the 700 μs time constant. Consequently, during each of the bursts 42, 44 of pulses at 7.8 kHz, the output of the pulse extender 38 is held low. Indeed, since the 700 μs time constant is several times longer than the period of the 7.8 kHz waveform, the pulse extender 38 is unaffected if several cycles of the input are missed because they have been cancelled by interference. This provides a measure of protection against such cancelling interference.

As can be seen in FIG. 3(c), the output of the pulse extender 38 goes high 700 μs after the last pulse of the burst 42 or 44.

The pulse extender 40 is constructed in the same way as the pulse extender 38, except that it has a time constant of 47 ms. The burst of pulses 44 caused by interference is shorter than this 47 ms time constant, and consequently the output of the pulse extender 40 remains low during and after such an interference burst. However, in the case of the desired start signal, the burst 42 lasts longer than 47 ms. After 47 ms from the beginning of the burst 42, the output of the pulse extender 40 goes high. This is illustrated in FIG. 3(d).

The high output of the pulse extender 40 is used to close the analogue switch 34. This transmits the remainder of the burst 42 of pulses of the start signal, as shown in FIG. 3(e). They are taken to the detector which detects them and switches on the remaining circuitry of the probe, including the transmitter 20 (FIG. 1).

The circuit of FIG. 2 is therefore particularly useful because it can be retrofitted to an existing circuit design.

The circuit of FIG. 2 discriminates, on a time basis, between the bursts 42 of pulses caused by a genuine start signal, and shorter bursts 44 caused by interference. The inventors' research shows that around 90% of interference bursts are shorter than the genuine start signal, and can be distinguished in this way. The time constant of the pulse extender 40 is chosen so as to be less than the duration of a genuine start signal, but more than the duration of most interference bursts. As noted above, the time constant of the first pulse extender 38 is chosen so as to be several periods of the incoming pulse waveform, providing immunity to cancellation of some of the incoming pulses by interference.

Figure 5:
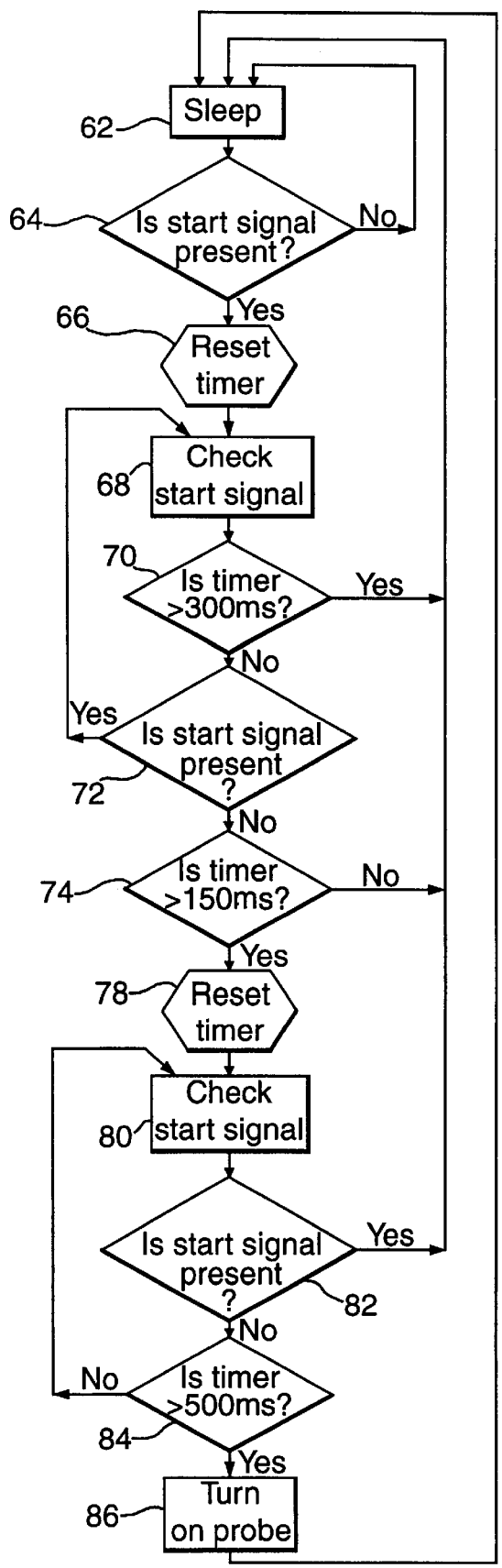
FIG. 5 is a flow chart of a program followed by a microprocessor in the circuit of FIG. 4.

However, the circuit of FIG. 2 will not provide protection against interference signals which are longer than the genuine start signal 42, or which are caused by continuous background noise. The second embodiment of the invention, shown in FIGS. 4 and 5, is intended to overcome this problem.

The circuit of FIG. 4 takes an input 46 from the amplifier 32, seen in FIG. 2. It is a dual rectifier circuit, comprising diodes 48, 50. Each rectifier circuit has a time constant, provided by a respective resistor/capacitor combination 52, 54. The time constant of the rectifier circuit 48, 52 is fast (compared to the length of the burst of pulses comprising a start signal), while the time constant of the rectifier circuit 50, 54 is slow compared to the length of this burst. The output of the slow rectifier 50, 54 is biased by a resistor 56 to a higher voltage than the fast rectifier 48, 52.

The purpose of the dual rectifier is to average out the input signal. The fast rectifier 48, 52 responds to short signal bursts, while the slow rectifier 50, 54 gives a good average signal voltage. The two rectified voltages are compared in a comparator 58, in order to generate a single output signal. The output is high when the slow rectifier is higher than the fast rectifier, and low in the reverse state.

When a genuine start signal is received at the input 46, the fast rectifier 48, 52 responds by raising its output voltage. This in turn causes the output of the comparator 58 to go low, since the slow rectifier voltage will not change very much during this time. When the start signal finishes, the output returns high.

When the circuit receives interference from a source such as a fluorescent light, the fast rectifier responds quickly as before, causing the output of the comparator to go low. After a few seconds of continuous noise, however, the slow rectifier will charge to a steady state which will be biased as before above the fast rectifier, and this will cause the output to go high. The normal state of the comparator 58, in the absence of an input signal, is that the output of the rectifier 50, 54 is biased higher than that of the rectifier 48, 52, and so the comparator output is high. However, if a burst of 7.8 kHz pulses is received on top of the continuous noise, the output of the fast rectifier 48, 52 increases and the comparator output goes low, as above.

The time constants of the elements 52, 54 are thus chosen such that the fast rectifier is short compared to the period of a normal start signal, e.g. 10 ms. The time constant of the slow rectifier 50, 54, on the other hand, is much longer, say 1s, so that the output is held high in the event of continuous noise. The circuit of FIG. 4 therefore provides immunity against such continuous noise.

This still leaves the problem of distinguishing between a genuine start signal and an interference signal (which might comprise a burst of pulses which is shorter or longer than that of the genuine start signal). To achieve this, the output of the comparator 58 is taken to a microprocessor circuit 60, running the program shown in FIG. 5.

In the quiescent or "sleeping" state, the program merely loops between steps 62, 64, waiting for an input signal (a low output from the comparator 58). When such an input appears, a software timer is reset (step 66). There now follows a loop (program steps 68, 70, 72) during which the program continuously monitors whether the start signal is still present as the timer increments. If the start signal remains present for longer than 300 ms, this is detected at step 70, and the program returns to the sleeping state 62. Thus, interference which is longer than 300 ms is ignored.

If the start signal ceases before the end of the 300 ms time period, the program proceeds to step 74, which checks the time to see if the start signal lasted for longer than 150 ms. If the start signal was shorter than 150 ms, this is presumed to be a short interference burst (such as the burst 44 in FIG. 3), and again the circuit returns to its sleeping state 62. Thus, if there is an affirmative output from the program step 74, this indicates that there has been a start signal greater than 150 ms and less than 300 ms.

A simple version of the program may end after the step 74, providing an output on a line 76 (FIG. 4) in order to turn on the rest of the probe circuitry.

Optionally, however, the program of FIG. 5 includes further steps as follows. On receipt of an affirmative response from program step 74, a software timer is reset (step 78). There follows another program loop consisting of steps 80, 82, 84, which determine whether another start signal is present within a time window lasting 500 ms. If there is, then the first start signal cannot have been genuine, but must have been caused by recurring interference which can be generated by some kinds of fluorescent lights. In this event, the program returns to its sleeping state 62. Only if no further start signal is received within the 500 ms window is the probe turned on (step 86). Again, this is achieved by producing an output on the line 76.

The output on the line 76 is simply a change of level in order to turn on the remaining probe circuitry. However, this can be difficult to retrofit in an existing circuit design. It is not possible simply to take this signal to a switch 34 as in FIG. 2, in order to pass start signal pulses to a detector in an existing circuit. This is because, after a time delay of 300 ms or 500 ms, such start signal pulses no longer exist. Consequently, where the circuit is to be retrofitted to an existing design, the program step 86 should regenerate a burst of pulses, similar to that of a genuine start signal, to be set to the detector. This burst may be regenerated either by software or by hardware.

It will be seen that the embodiment of FIGS. 4–5 distinguishes a genuine start signal from interference which is either shorter or longer than the genuine signal, or from continuous or recurring interference.

If desired, the circuit of FIG. 2 could be enhanced by providing extra circuitry to ignore the signal if it exceeds 250 ms (the maximum length of a genuine start signal). As in the case of the program step 86 in FIG. 5, the output may be a simple change of level in order to switch on the remaining probe circuitry, or it may regenerate a burst of pulses to simulate a genuine start signal, to be supplied to the detector of an existing circuit.

The circuits described may be used for installations having multiple probes on the same machine tool, or on adjacent machine tools. As in EP 337669, a coded start signal for each probe can be provided, to ensure that only the desired probe is switched on. This could be achieved in the same manner as in EP 337669, using different modulation frequencies (and corresponding bandpass filters 30) for the other probes, instead of the 7.8 kHz discussed above. Our preference, however, is to provide different lengths for the burst of pulses comprising the start signal.

For example, different probes could have start signals 42 of 150 ms, 200 ms, 250 ms and 300 ms lengths. The timers 70, 74 in the program of FIG. 5 are then set to appropriate values to distinguish these start signals, e.g. 225 ms and 175 ms in order to distinguish the 200 ms start signal from the others. This has the advantage that the same circuitry is used in each probe, and only the program is different.

A similar effect can be achieved in the circuit of FIG. 2 by appropriate selection of the time constant of the pulse extender 40 and of the extra circuitry mentioned above which ignores the signal if it exceeds the maximum length of a genuine start signal.

A further option is to provide circuitry (or a program as in FIG. 5) which switches on the remaining probe circuitry (including the transmitter 20) if a start signal is received which is longer than a predetermined minimum. This circuitry then switches the remaining probe circuitry off again if the start signal remains for longer than would be expected for a genuine start signal. For example, the probe circuitry could be turned on after a signal lasting for a minimum of 47 ms (as in FIG. 3(*d*) and (*e*)) but could switch the circuitry off again if the start signal is still present after 250 ms. This option can be advantageous with some machine tool controllers, where the 300 ms or 500 ms delay of the program of FIG. 5 may cause timing problems. The slight disadvantage is that the probe is turned on for a brief period of time, but this will not significantly reduce the battery life.

In normal operation of the probe of FIG. 1, it is necessary to turn the probe off after use. This may be done by arranging the probe to time out after a predetermined period of non-use, when the probe has not been triggered by contact between the stylus 18 and a workpiece. Alternatively, the module 24 may be commanded by the machine tool controller to send another signal from its transmitter 26, which is detected in any of the ways discussed in relation to FIGS. 2–5, in order to toggle the probe into the "off" state.

The preferred embodiments of the invention have related to probes used in measurement on machine tools. However, the invention is also useful on other positioning machines, such as coordinate measuring machines and measuring robots. Whilst optical transmission systems have been described, the invention may also be used for other wireless transmission systems, e.g. radio.

What is claimed is:

1. A probe having a wireless signal transmission circuit, a detecting circuit for detecting an optical switch-on signal and switching on the signal transmission circuit when the switch-on signal is received, the detecting circuit including a time discriminating circuit which discriminates whether an input signal is a switch-on signal or interference on the basis of the duration of the switch-on signal.

2. A probe according to claim 1, wherein the time discriminating circuit determines that an input signal is a switch-on signal rather than the interference if its duration is longer than a first predetermined time period.

3. A probe according to claim 2, wherein the time discriminating circuit determines that the input signal is a switch-on signal rather than interference if its duration is also shorter than a second predetermined time period, the second predetermined time period being longer than the first.

4. A probe according to claim 1, wherein the time discriminating circuit determines that the input signal is a switch-on signal rather than interference if its duration is shorter than a predetermined time period.

5. A probe according to claim 1, wherein the time discriminating circuit includes a first circuit component with a fast time constant; and a second circuit component with a slow time constant; the second circuit component generating an output responsive to an average of an input signal while the first circuit component generates an output in response to shorter input signals; and a comparator connected to the outputs of the first and second components, to distinguish a switch-on signal from continuous interference.

6. A probe according to claim 1 wherein, if the time discriminating circuit has determined that the duration of an input signal is consistent with a switch-on signal, it checks for the presence of an input signal after a further predetermined time period, thereby discriminating between a switch-on signal and recurring interference.

7. A probe according to claim 1, wherein the time discriminating circuit comprises a programmable device into which is programmed at least one time period which is predetermined in relation to the duration of the switch-on signal.

8. A method of switching on a probe having a wireless signal transmission circuit, the method comprising:

sending a wireless switch-on signal of a predetermined duration to the probe;

discriminating between the switch-on signal and interference on the basis of the duration of the switch-on signal; and switching on the probe if the switch-on signal is detected.

* * * * *

UNITED STATES PATENT AND TRADEMARK OFFICE
CERTIFICATE OF CORRECTION

PATENT NO.    : 6,472,981 B2
DATED         : October 29, 2002
INVENTOR(S)   : Jonathan P. Fuge and David Collingwood It is certified that error appears in the above-identified patent and that said Letters Patent is hereby corrected as shown below:

<u>Title page,</u>
Item [73], Assignee, change name from "Reinshaw PLC" to -- Renishaw PLC --

Signed and Sealed this

Eighteenth Day of February, 2003

JAMES E. ROGAN
*Director of the United States Patent and Trademark Office*